Patented Sept. 10, 1935

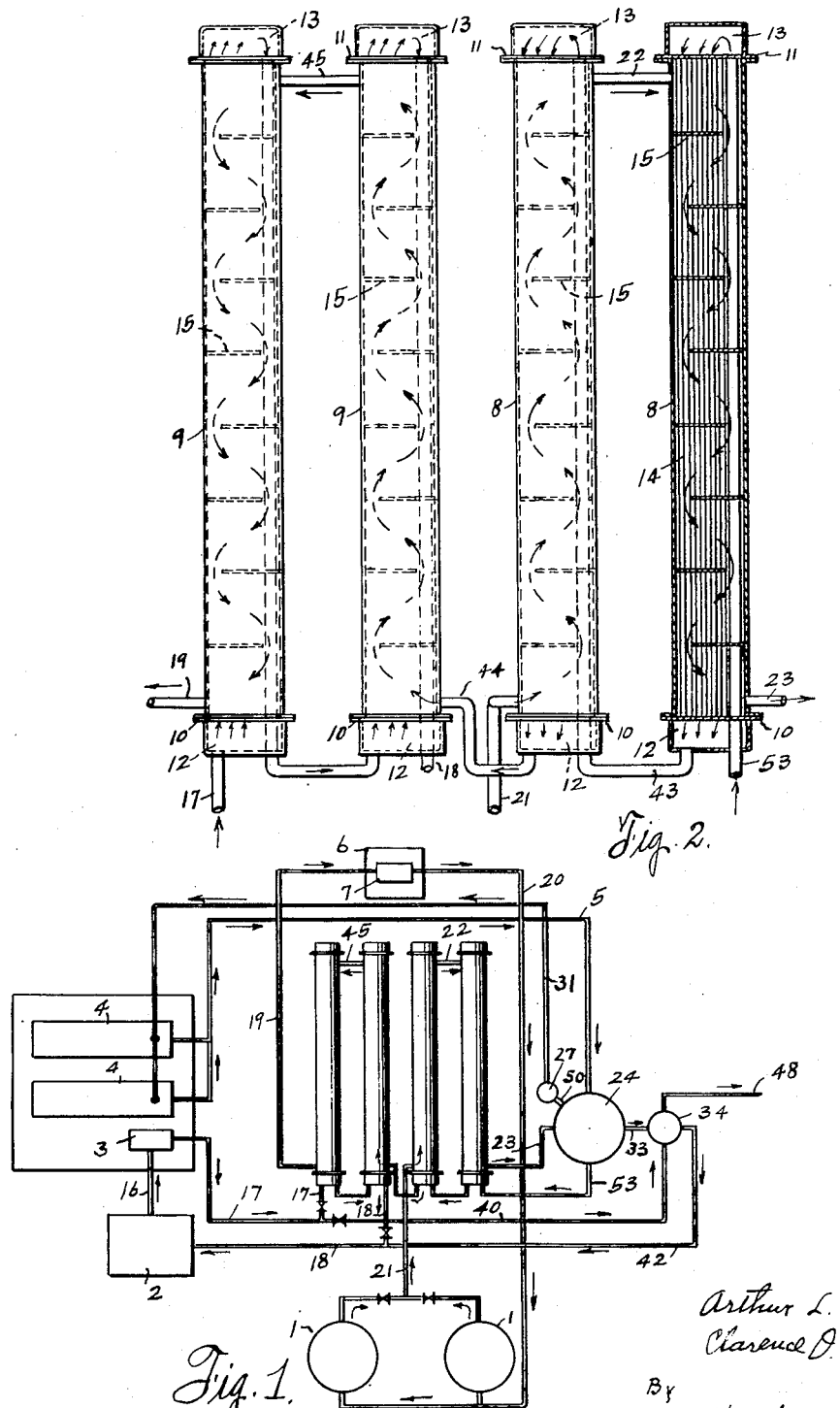

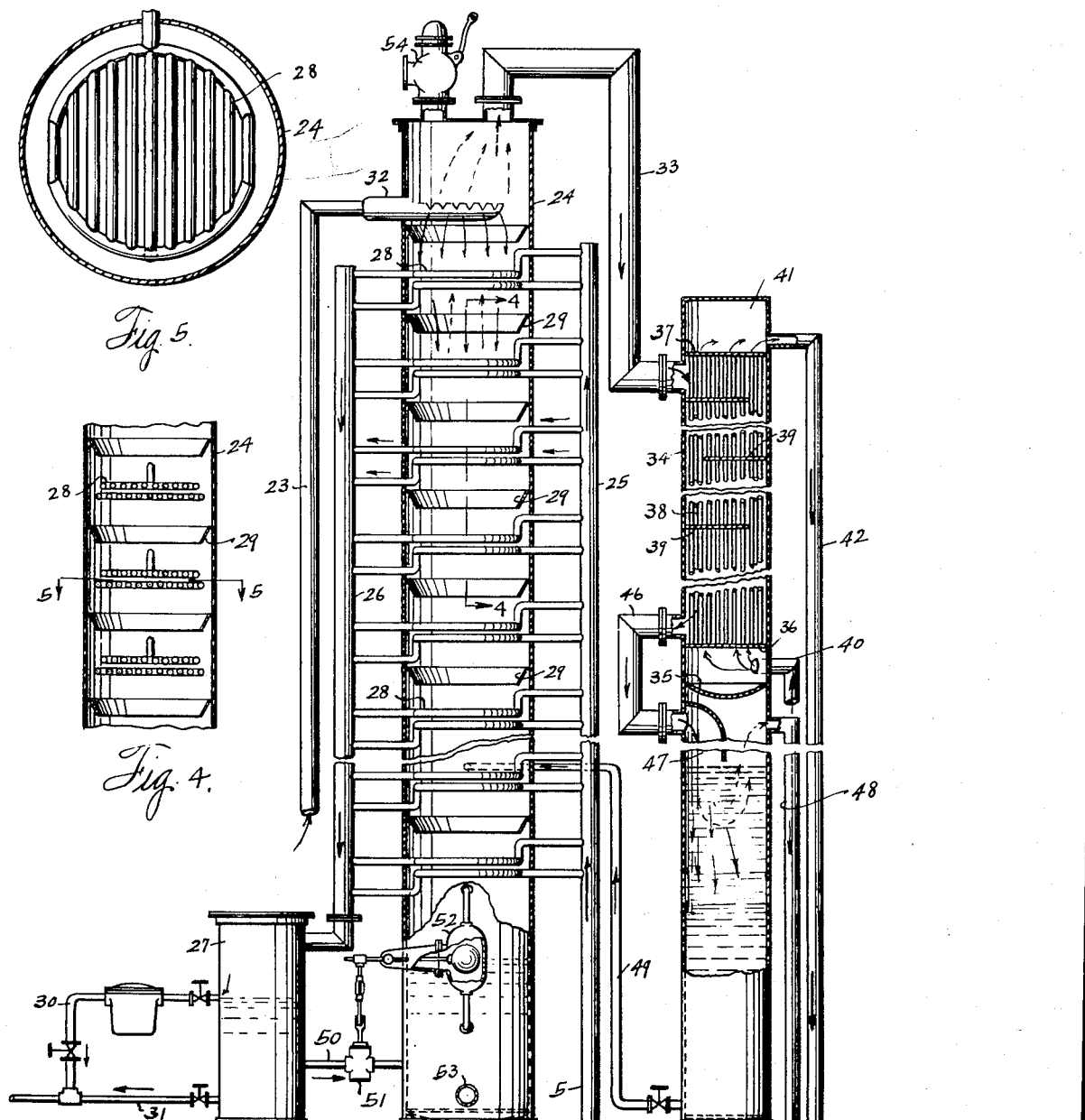

2,014,250

UNITED STATES PATENT OFFICE 2,014,250

APPARATUS FOR REACTIVATING A TREATING AGENT

Arthur L. Forbes, Jr., and Clarence O. Byrne, El Paso, Tex.

Application February 26, 1932, Serial No. 595,326

5 Claims. (Cl. 202—158)

This invention relates to apparatus and process for re-activating a treating agent, and has more particular relation to an apparatus and process for reactivating the treating element, or solution, used in the separation of hydrogen sulphide from natural gas.

An object of the invention is to provide, in a gas treating plant, a novel type of still whereby the treating agent, such as soda ash, may be separated from the hydrogen sulphide, so that the former may be re-used and the latter disposed of.

Another object is to provide apparatus of the character described whereby the treating solution, after it has passed through the scrubbing tower and absorbed the hydrogen sulphide, may be passed, successively, through heating zones whereby the treating agent and hydrogen sulphide will be separated.

Another object is to provide, in a gas treating plant a still having heating elements, or coils arranged in successive stages and means for delivering the solution over said coils for separating the treating agent from the hydrogen sulphide and for delivering the same separately, from the still, the one for re-use and the other for disposition.

Another object of the invention resides in a novel method of separating the treating solution from the absorbed hydrogen sulphide.

With the above and other objects in view, the invention has particular relation to certain novel features of construction, operation and arrangement of parts and to a certain novel process, an example of which is given in this specification and illustrated in the accompanying drawings, wherein:—

Figure 1 shows a diagrammatic plan view of a gas treating plant embodying the invention.

Figure 2 shows a plan view of the coolers and heat exchangers.

Figure 3 shows a side view partly in section of the reactivating still showing the condenser for the treating agent and steam receiver.

Figure 4 shows a fragmentary vertical sectional view of the still, taken on the line 4—4 of Figure 3, and Figure 5 shows an enlarged cross sectional view thereof taken on the line 5—5 of Figure 4.

Referring now more particularly to the drawings wherein like numerals of reference designate similar parts in each of the figures the numerals 1, 1 designate the treating, or scrubbing, towers, one or more of which may be employed. The numeral 2 designates a cooling tower connected with which there is a circulating pump 3. The numerals 4, 4 designate the boilers leading from which there is the steam line 5. Located in the pump house 6 there is a high pressure pump 7. There are the companion heat exchangers 8, 8 and coolers 9, 9. These exchangers and coolers are of similar construction each having the anchor plates, or partitions, 10, 11 spaced from the ends thereof, forming the respective end chambers 12, 13 and to which the ends of the tubes of the nests as 14 are anchored and through which said tubes extend. These nests of tubes extend through the staggered baffles, as 15, in each of the heat exchangers and coolers. Water is circulated, by the pump 3, from the tower 2, through the lines 16, 17 into the chamber 12 of one of the coolers 9 and thence through the nest of tubes 14 thereof into the chamber 13, of said cooler and thence from said last mentioned chamber, through the pipe 18 back to the cooling tower 2.

Leading out from one of the coolers 9 there is a soda ash solution line 19 which leads to the suction of the high pressure pump 7 and the soda ash solution through this line is returned by the pump 7, under pressure, through the return line 20 which branches and enters each of the scrubbing towers 1, 1. The gas to be treated is passed through the scrubbing towers by the usual system of piping in common use and not shown on the drawings.

The soda ash solution absorbs the impurities to be removed from the natural gas in the scrubbing towers and the cleansing solution, with the hydrogen sulphide therein, passes thence through the water line 21 into one of the heat exchangers 8 near one end and passes thence around the tubes of the nest of tubes therein and past the baffles 15 and at the other end of said heat exchangers passes through the pipe 22 into the other heat exchanger and passes thence around the tubes of the nest 14 and past the baffles 15 therein and out through the pipe 23.

A general description of the treating plant as a whole has been given hereinabove for a better understanding of the reactivating apparatus and process wherein the invention resides and which will be now more specifically described:—

The numeral 24 designates the tower, or shell, of the still, and the steam line 5 terminates in a manifold 25 alongside the tower 24 and alongside the opposite side of the tower there is a relief manifold 26 which terminates in the upper end of the steam receiver 27.

There is a series of pairs of steam coils as 28 arranged one above the other in the tower 24 and connected into the manifolds 25, 26 through which hot steam is circulated. The coils of the respective pairs are preferably arranged in staggered relation as illustrated in Figure 4.

Above the respective pairs of coils are the annular hopper like guides 29 for directing the downwardly flowing fluid onto the coils beneath. The spent steam is collected in the receiver 27 and the condensation in said receiver collects at the bottom thereof while the steam at the top passes through the line 30, having the steam trap incorporated therein, and the water condensed in said trap is delivered on through the line 30 into the return line 31 which leads out from the bottom of the steam receiver and through which the water is conducted back to the boilers.

The solution from the scrubbing towers passes through the heat exchangers hereinabove described and out through the line 23 which terminates in a discharge nozzle 32 in the tower 24 above the upper pair of coils 28 and the solution is sprayed by said nozzle 32 downwardly and flows in successive stages over the pairs of hot coils 28. The hydrogen sulphide is separated from the solution and passes with the steam generated by the coils 28 back up through the tower and is led off from the top of said tower through the line 33 and enters the upper part of the condenser shell 34. This shell has a transverse partition 35 concavo convex in form as shown in Figure 3, and arranged approximately midway of said shell 34. Above this partition 35 the shell 34 has the lower and upper transverse anchor plates 36, 37 the latter of which is arranged above the discharge end of the line 33 and supported by these plates there is a nest of tubes 38 whose ends extend through said respective anchor plates and the tubes of this nest extends through the baffles 39 arranged in staggered relation in said shell.

There is a water pressure line 40, connected into the line 17, which enters the shell 34 above the partition 35 and the water from this line circulates up through the tubes 38 into the chamber 41 above the tube plate 37 and is returned thence through the line 42 back to the line 18 and thence through the cooling tower 2 and back to the pump 3.

The steam and hydrogen sulphide passing through the line 33 is circulated about the tubes 38 and is by passed around the partition 35 through the bypass pipe 46 into the trap 47 beneath said partition 35. The condensed water falls down to the bottom of the condenser while the separated hydrogen sulphide passes out through the line 48 and may be carried to the burners of the boiler furnaces or elsewhere for disposition.

The steam which has gone over into the condenser will condense and collect in the bottom of the condenser shell. This condensed water will contain certain amount of hydrogen sulphide. A water line 49 leads from the bottom of the condenser shell and terminates in the still tower 24 above some of the steam coils in said tower but beneath the trap 47. As the water rises in the condenser shell above said terminating end of the water line 49 the water in the condenser shell will be intermittently transferred back into the still tower and will drain over the hot coils beneath and the hydrogen sulphide remaining in said transferred water, or the major portion thereof, will be distilled out and passed back through the return line 33 into the condenser.

Leading from the steam receiver 27 into the bottom of the still tower 24 there is a water line 50 controlled by the valve 51 and this valve in turn is controlled by the liquid level controller 52, of conventional construction which intermittently opens the valve 51 whenever the clean soda ash solution in the still tower becomes low. There is some mechanical loss in the water which contains the soda ash at the bottom of the still tower and the water line 50 and its automatically controlled valve 51 have been provided so that the required amount of water which collects in the steam receiver, may be automatically supplied into the still tower.

The cleansed soda ash solution may pass out through the line 53, which extends through one of the heat exchangers 8, to the chamber 13 thereof, and passes thence through the tubes 14 and the pipe 43 to the chamber 13 of the other heat exchanger and passes thence through the tubes of this last mentioned heat exchanger and through the line 44 into one of the coolers 9 and thence around the tubes and past the baffles of said cooler and passes thence through the pipe 45 into the other cooler and thence passes around the tubes and past the baffles of said last mentioned cooler to the pipe 19 from which it is taken by the pump 7 and returned to the scrubbing towers through the pressure line 20.

The lines 17, 18, 21, 30, 31 and 49 are equipped with suitable valves for controlling the flow of fluid therethrough and the tower 24 is equipped with a suitable safety valve 54 for relieving the excess pressure that may accumulate therein.

In the treatment of natural gas for the removal of hydrogen sulphide therefrom, it has heretofore been the practice to aerate the treating solution to remove the absorbed hydrogen sulphide therefrom, after this solution has passed through the scrubbing tower of the plant, so that the treating solution may be again used; but this aerating process is slow and requires expensive equipment and the apparatus forming the subject matter of this invention has been designed for the recovery of the treating agent in an expeditious and inexpensive manner and for collecting the objectionable hydrogen sulphide so that the same can be disposed of.

The drawings and description now disclose what is considered to be a preferred form of the invention by way of illustration only while the broad principle of the invention will be defined by the appended claims.

What we claim is:

1. Apparatus for liberating an absorbed gaseous element from a solution containing an absorbing agent comprising a still tower, a receiver, a condenser, heating coils arranged in the tower one above the other, a supply line connected with the coils, a relief line connected with each of the coils and connected into the receiver, means for delivering the solution into the tower above the coils to permit the flow of the solution over the coils by gravity, whereby water and the absorbed element are liberated in the form of vapor, means through which the vapor is delivered to the condenser and means through which water collecting in the receiver may be intermittently and automatically returned into the tower.

2. Apparatus for purifying an absorbing solution containing an absorbed gaseous element, including a tower having heating coils spaced apart therein, one above the other, means for circulating a heating agent through said coils, means for delivering the solution to be cleansed into the tower above said coils to permit the solution to pass by gravity over said coils, whereby the absorbed element will be liberated from the solution, downwardly converging guides in the tower arranged alternately with respect to the coils, a condenser and means for taking off said liberated element and said purified solution separately from the tower and for delivering said liberated element to the condenser and means for intermittently and automatically transferring the condensate in the condenser into the still tower above some of the coils.

3. Apparatus for liberating an absorbed gaseous element from a solution containing an absorbing agent to cleanse said solution, said apparatus including a still tower, a receiver, heating coils arranged in the tower one above the other, a supply line connected with, and provided to deliver a heating fluid to, the coils, a relief line leading from each of the coils to said receiver, means for delivering the solution to be cleansed into the tower above said coils to permit the flow of the solution over the coils by gravity, whereby water and the absorbed element are liberated from the solution in the form of vapor and means for intermittently, and automatically, returning the water condensed in the receiver into the cleansed solution in the still tower beneath the coils.

4. Apparatus for liberating an absorbed gaseous element from a solution containing an absorbing agent to cleanse said solution, said apparatus including a still tower, a condenser, heating coils arranged, one above the other, in said tower, a steam supply line connected with the coils for delivering a heating fluid thereto, means for delivering the solution into the tower above said coils to permit the flow of the solution over said coils, by gravity, whereby water and the absorbed element will be liberated from the solution, in the form of vapors, means for conducting said vapors into the condenser, and means for intermittently transferring the water collecting in said condenser into the still tower between the coils therein.

5. Apparatus for liberating an absorbed gaseous element from a solution containing an absorbing agent to cleanse said solution, said apparatus including a still tower, a condenser, heating means arranged one above the other in said tower, means for supplying a heating agent to said heating means, means for delivering the solution into the tower above said heating means to permit the flow of said solution over said heating means by gravity whereby water and the absorbed element will be liberated from the solution in the form of vapors, means for conducting said vapors from the still tower into the condenser, means for intermittently transfering the water collecting in the condenser into the still tower above some of the heating means therein.

ARTHUR L. FORBES, Jr.
CLARENCE O. BYRNE.